United States Patent [19]

Fussgänger

[11] Patent Number: 4,910,727

[45] Date of Patent: Mar. 20, 1990

[54] OPTICAL TRANSCEIVER HAVING WAVEGUIDE COUPLERS FOR FILTERING AND DUPLEXING TRANSMIT AND RECEIVE WAVELENGTHS

[75] Inventor: Kurt Fussgänger, Remseck, Fed. Rep. of Germany

[73] Assignee: Alcatel N.V., Amsterdam, Netherlands

[21] Appl. No.: 9,965

[22] Filed: Feb. 2, 1987

[30] Foreign Application Priority Data

Feb. 19, 1986 [DE] Fed. Rep. of Germany ....... 3605248

[51] Int. Cl.[4] .............................................. H04B 9/00
[52] U.S. Cl. ...................................... 370/3; 455/602; 455/606; 455/612; 455/617
[58] Field of Search ............... 455/607, 606, 617, 602, 455/618, 619, 612; 370/3; 350/96.11

[56] References Cited

U.S. PATENT DOCUMENTS

| | | | |
|---|---|---|---|
| 4,199,226 | 4/1980 | Weber et al. | 350/157 |
| 4,289,373 | 9/1981 | Sugimoto | 350/96.16 |
| 4,292,512 | 9/1981 | Miller et al. | 250/205 |
| 4,545,048 | 10/1985 | Hauk et al. | 370/3 |
| 4,748,689 | 5/1988 | Mohr | 370/3 |

FOREIGN PATENT DOCUMENTS

| | | |
|---|---|---|
| 0187198 | 7/1986 | European Pat. Off. . |
| 2851625 | 6/1980 | Fed. Rep. of Germany . |
| 3012184 | 10/1981 | Fed. Rep. of Germany . |
| 3137442 | 3/1983 | Fed. Rep. of Germany . |
| 00120330 | 7/1983 | Japan .................................. 455/607 |

OTHER PUBLICATIONS

"Low Reflectance Terminations and Connections for Duplex Fiber-Optic Telecommunication Links", M. D. Drake, 2219 Appl. Optics, vol. 20, 5-81, No. 9, N.Y.
"Optical Multiplexing of Fibre Optic Systems", O. Krumpholz et al., 8029 Electronic Engr., 57(1985) Apr., No. 700, London, Great-Britain.
Patent Abstracts of Japan, Band 6, Nr. 38 (P105) [916], Mar. 9, 1982; & JP-A-56 156 810 (Nippon Denki K.K.), 03-12-1981.
Conf. Proc. 10 ECOC, Stuttgart 1984, pp. 166-167.
Siemens Forsch.-und Entwicklungs-Ber. Bd. 15 (1986), No. 1, Springer Verlag, pp. 32-39.
Wiss. Ber. AEG-Telefunken 53 (1980), 1-2, pp. 17-22.
Tanaka, "Simple Structure High Isolation MUX/-DEMUX", Electronic Letters, 11-6-80, vol. 16, No. 23, pp. 869-870.
Kobayashi, "Microoptic Grating MUX and Optical Isolators for Fiber Optic Communication", IEEE Quantum Electronics, vol. QE-16, #1, 1-80, pp. 11-22.
"Bidirectional Video Transmission System Using a Single Optical Fiber", Ichida et al., Proceedings of the Optical Communications Conference, 20.3/1-4, Sep. 1979.
Technische Mitteilungen PTT, 7/1982, "Premiere Installation D'essal a Fibers Optiques a 34 Mbit/s en Suisse", Kaser et al., pp. 304-313.

Primary Examiner—Robert L. Griffin
Assistant Examiner—Leslie Van Beek
Attorney, Agent, or Firm—Christie, Parker & Hale

[57] ABSTRACT

An optical transceiver module is disclosed, particularly for connection to a bidirectional optical-waveguide communications network. It contains an optical transmitter (S), an optical receiver (E), and wavelength-selective means (K, C) which prevent any optical feedback to the optical transmitter (S) and the optical receiver (E) and guide the light to be received exclusively to the optical receiver (E). Such means are, for example, wave-length-selective couplers (C, K) implemented as fiber-optic couplers or as one or more integrated optical devices.

8 Claims, 1 Drawing Sheet

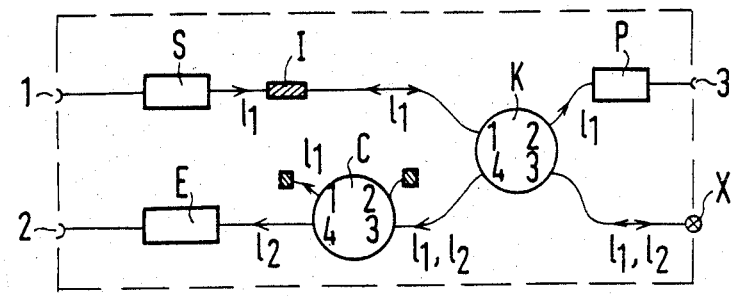

OPTICAL TRANSCEIVER HAVING WAVEGUIDE COUPLERS FOR FILTERING AND DUPLEXING TRANSMIT AND RECEIVE WAVELENGTHS

The present invention relates to an optical transceiver module as set forth in the preamble of the main claim. A module of this kind is described by B. Hillerich et al, "Duplexer with Hybrid Integrated Light Emitter and Detector", Conf. Proc. 10th ECOC, Stuttgart, 1984, pp. 166-167.

This prior art module contains a light emitter, a light detector, two spherical lenses, a wavelength-selective sharp-cutoff filter for separating the transmitted light and the received light, an optical waveguide connected to the detector and containing a further wavelength-selective filter, and a bidirectional optical transmission waveguide. Because of the large number of optical components, such a module has high reflection losses. In addition, the individual components must be adjusted, and since this can only be done with limited accuracy, only graded-index fibers can be used for the optical waveguides.

The object of the present invention is to provide an optical transceiver module to which all kinds of optical waveguides are connectable.

The optical transceiver module in accordance with the invention has very low optical losses. Light emitted by the transmitter and reflected at splices or at a plug cannot reach the transmitter or the receiver; instead, it can be used to monitor the operation of the transmitter, for example. Furthermore, the waveguide couplers can be made in one piece, so that low-cost automatic mass production is possible. In addition, such couplers have high wavelength selectivity and permit wavelength spacings of, e.g., 10 nm-300 nm.

Such modules are mainly intended for use as subscriber line modules for bidirectional optical communication systems using time- and/or wavelength-division multiplexing.

An embodiment of the invention will now be explained with reference to the single figure of the accompanying drawing. Further embodiments are contained in the description.

The optical transceiver module shown in the figure contains a transmitter S, a receiver E, an optical isolator I, two wavelength-selective couplers C, K, and a photodiode P. The optical transmitter S is connected via the optical isolator I to one port of the coupler K. The latter is a wavelength-selective fused four-port optical-waveguide coupler. Such couplers are well-known in the prior art and may for instance be of the type disclosed in "*All-Fibre Wavelength Filters Using Concatenated Fused-Taper Couplers*" by M. S. Yataki et al published in ELECTRONIC LETTERS, Vol. 21 No. 6 (14 March 1985. Connected to the second port of the coupler K is the photodiode P, which delivers an electric signal dependent on the operational state of the transmitter S and which is thus useful for checking and controlling the operation of the transmitter. The third port of the coupler K is connected to a plug X which serves to connect the transceiver module to an optical waveguide of a communications network. The fourth port of the coupler K is connected to the third port of the coupler C, a wavelength-selective fused optical-waveguide coupler, too. The fourth port of the coupler C is connected to the optical receiver E. The first and second ports of the coupler C are terminated by reflectionless terminations. The two couplers C, K consist of three pieces of single-mode optical waveguide which were fused together; as shown in the figure, the first Piece VV1 runs from the optical isolator I to the photodiode P, and the second Piece VV2 from the optical receiver E to the plug X, while the third Piece VV3 interconnects the first and second ports of the coupler C. As disclosed in the above-referenced Yataki et al article, such a form of construction avoids the necessity of splicing the couplers together.

The optical transmitter S is an electrical-to-optical transducer, such as a laser, a laser diode, or a lightemitting diode, which converts a first electric signal entering through a terminal 1 to a modulated light beam of wavelength $l_1$. The optical receiver is an optical-to-electrical transducer, e.g., a photodiode, which converts a light beam of wavelength $L_2$ coming from the communications network and entering through the plug X to a second electric signal, which appears at a terminal 2. The electric signal delivered by the photodiode P appears at a terminal 3. With this signal, the optical transmitter S can be monitored and controlled in a manner known per se.

The light of wavelength $l_1$ from the optical transmitter S passes through the optical isolator I to the coupler K, which transmits most of the light to the plug X and a small portion to the photodiode P. In the plug, a small portion of the light arriving there is reflected; this light returns through the coupler K and the optical isolator I to the transmitter S and, on the other hand, reaches the coupler C, which transmits only light of wavelength $l_2$ to the optical receiver E. Therefore, light of wavelength $l_1$ is absorbed in the absorbers at the first and second ports of the coupler C.

Light coming from the communications network passes through the coupler K to the coupler C and is absorbed in the absorbers unless it has the wavelength $l_2$.

The optical isolator I is a single-mode fiber whose core is doped with rare earths (yttrium, gadolinium, thulium, holmium) and/or iron. It can also be a ferromagnetic crystal, particularly a rare-earth-iron-garnet crystal ($Y_3Fe_5O_{12}$, $Y_{1.5}Gd_{1.5}Fe_5O_{12}$, $Tm_3Fe_5O_{12}$, $Gd_3Fe_5O_{12}$, $Ho_3Fe_5O_{12}$). The length L of the optical isolator I is chosen so that, for a given magnetic-field strength H and Verdet constant V, the plane of polarization is rotated between the output of the optical transmitter E and the plug X by an angle of $W = VLH = 45°$ (Faraday effect). If a low-reflection plug is used, the optical isolator I can be eliminated.

In a second embodiment of the invention, the optical transceiver module is connectable to the communications network by means of a splice rather than the plug X. As the back reflection of transmitted light is then negligible, the optical isolator I can eliminated.

Further embodiments of the optical transceiver module differ from those described so far by the absence of the photodiode P or in that the photodiode is connected to a different port of the coupler C, e.g., the first port.

To improve the filter action, the coupler C may consist of two or more couplers in series, with the fourth port of one coupler connected to the third port of the other coupler, and the free ports terminated by reflectionless terminations. Such a coupler arrangement acts like a band-pass filter and is, therefore, especially suited for use in bidirectional wavelength-division-multiplex systems. The invention is not limited to the types of optical waveguides and couplers described in connection with the embodiment of FIG. 1. In particular, optical fibers and couplers made therefrom may be replaced by integrated optical devices, such as waveguide structures formed by doping a lithium-niobate substrate and having the functional properties mentioned above. In a particularly advantageous embodiment of the optical transceiver module, the optical transmitter S, the optical receiver E, the couplers C, K, and, if present, the optical isolator I and the photodiode P are integrated on a common substrate.

I claim:

1. An optical transceiver module comprising
    connection means for connecting said module to an external optical transmission waveguide,
    an optical transmitter operating at a first wavelength,
    an optical receiver operating at a second wavelength different from said first wavelength,
    optical duplexer means for coupling the optical transmitter and the optical receiver to the connection means,
    a first wavelength-selective filter having a receiver terminal, a transmitter terminal and a transmission terminal for selectively passing only said first wavelength between said transmission terminal and said transmitter terminal, and
    a second wavelength-selective filter coupled between the optical receiver and the receiver terminal of the first wavelength-selective filter for selectively passing only said second wavelength between said receiver terminal and said optical receiver,
    wherein
    the optical transmitter is connected to the external optical transmission waveguide through the first wavelength selective filter and the optical duplexer means,
    the optical receiver is connected to the external optical transmission waveguide through the second wavelength-selective filter and the optical duplexer means, and
    the optical duplexer means and the first wavelength-selective filter are integrally fabricated as a first waveguide coupler.

2. An optical transceiver module as claimed in claim 1, wherein
    said first wave-length selective filter passes both said first and second wavelength between said transmission terminal and said receiver terminal,
    said second wavelength-selective filter is fabricated as a second waveguide coupler and
    said second waveguide coupler is in series with said first waveguide coupler.

3. An optical transceiver module as claimed in claim 2, wherein
    said first and second waveguide couplers are fused single-mode waveguide couplers.

4. An optical transceiver module as claimed in claim 2, wherein
    said first and second waveguide couplers are implemented as integrated optical waveguide couplers.

5. An optical transceiver module as claimed in any one of claims 2 through 4, further comprising
    an optical isolator which rotates the plane of polarization of the light interposed between the optical transmitter and the optical duplexer means.

6. An optical transceiver module as claimed in any one of claims 1 through 4, wherein
    at least two otherwise free ends of at least one of the waveguide couplers are terminated by reflectionless terminations.

7. An optical transceiver module as claimed in any one of claims 1 through 4, wherein
    said means for connecting to an optical transmission waveguide comprises a plug or a splice.

8. An optical transceiver module comprising
    connection means for connecting said module to an external optical transmission waveguide,
    an optical transmitter operating at a first wavelength,
    an optical receiver operating at a second wavelength different from said first wavelength,
    optical duplexer means for coupling the optical transmitter and
    the optical receiver to the connection means,
    a first wavelength-selective filter having a receiver terminal, a transmitter terminal and a transmission terminal for selectively passing only said first wavelength between said transmission terminal and said transmitter terminal,
    a second wavelength-selective filter coupled between the optical receiver and the receiver terminal of the first wavelength-selective filter for selectively passing only said second wavelength between said receiver terminal and said optical receiver, and
    a photodiode for checking and controlling the operation of the optical transmitter connected to an otherwise free terminal of one of the waveguide couplers,
    wherein
    the optical transmitter is connected to the external optical transmission waveguide through the first wavelength selective filter and the optical duplexer means,
    the optical receiver is connected to the external optical transmission waveguide through the second wavelength-selective filter and the optical duplexer means, and
    the optical duplexer means and the first wavelength-selective filter are integrally fabricated as a first waveguide coupler.

* * * * *